Jan. 17, 1939.  J. P. SHANKLIN  2,144,203
METHOD FOR DIRECT INDICATION OF POSITION IN A GIVEN AREA
Filed Sept. 23, 1937
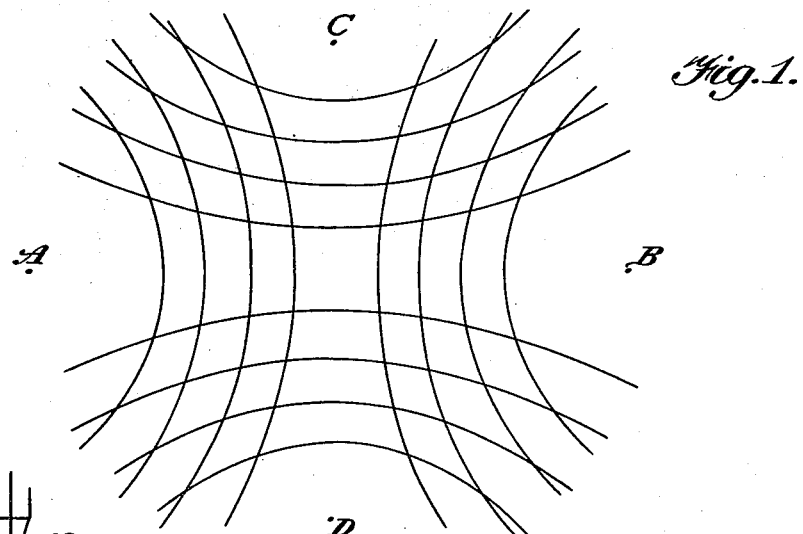
Fig. 1.
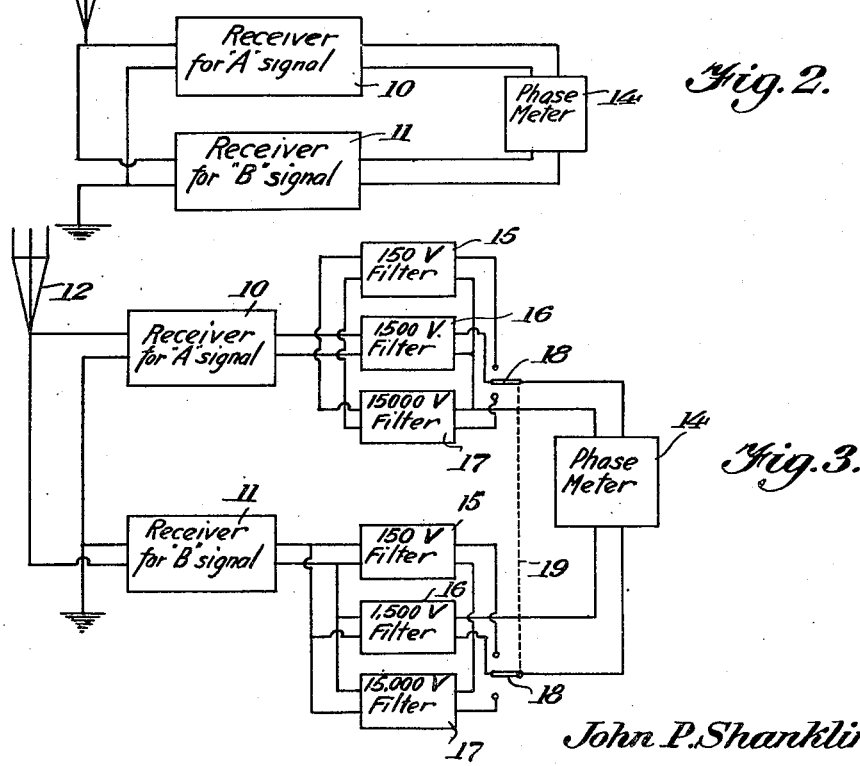
Fig. 2.
Fig. 3.
John P. Shanklin
INVENTOR
BY Victor J. Evans & Co.
ATTORNEY Patented Jan. 17, 1939

2,144,203

UNITED STATES PATENT OFFICE 2,144,203

METHOD FOR DIRECT INDICATION OF POSITION IN A GIVEN AREA

John P. Shanklin, Marion, Va.

Application September 23, 1937, Serial No. 165,404

5 Claims. (Cl. 250—11)

The object of the invention is to provide a method that makes possible, by direct reading, one's position in a given area; to provide a method of the kind indicated that will give such location of position whether the observation be made while the user is in motion or at rest; and to provide a method for direct indication of position that makes use only of conventional apparatus, or equipment, so that its application may be carried out with a minimum of expense.

With this object in view, the invention consists in a certain arrangement and employment of certain apparatus which are graphically illustrated in the accompanying drawing, wherein:

Figure 1 is a view graphically illustrating an area so controlled that by the use of conventional receiving and measuring apparatus one's position therein may be readily indicated.

Figure 2 is a graphical illustration of the receiving equipment.

Figure 3 is a similar view showing receiving equipment more refined than in Figure 2.

In carrying out the invention, transmitters are positioned at the points A and B of the controlled area and these transmitters will operate on any desired fundamental frequency. The distance between the transmitters at A and B is arbitrarily assumed to be 1,000 kilometers, since the invention can be best understood if described in connection with fixed distances.

Impressed on the fundamental frequencies of the transmitters, there is a modulation frequency whose wave length is directly proportional to the distance between the stations or transmitters. Since this distance is 1,000 kilometers, the modulation frequency had best be 150 cycles, since the wave length at this frequency is 2,000 kilometers. But the modulation frequencies are synchronized, which may be accomplished by reference to any standard frequency or by land lines, as clearly set out in Patent No. 1,942,262. With the modulation frequencies synchronized, the modulation tone from the station A will reach the station B one-half a cycle after it has left the station A. Similarly, the modulation tone from the station B will reach the station A one-half a cycle after it has left the station B. The two are, therefore, 180 degrees out-of-phase at the stations or transmitters A and B with their polarities respectively reversed, but in phase at midpoint between the stations or transmitters.

To take advantage of this condition, any translational means employed for translation over the controlled area is equipped preferably with the receivers 10 and 11 to be tuned respectively to the signals issuing from the transmitters at the stations A and B, the intake of the receivers being connected to a common antenna 12 carried by the translational means. The outputs of the receivers, however, are connected to a phase meter 14 whose indicator swings to either side of its normal centrally disposed zero position, so that when the signal from the transmitter A is leading, the indicator will swing in one direction, but in the other direction when the signal from the transmitter or station B is leading.

As the translational means progresses, therefore, if the receivers 10 and 11 are tuned to their respective stations or transmitters, the phase relation of the modulated signals will be shown by the phase meter, whose indicator will swing from one end of the scale to the other, standing in the zero or middle position at midpoint between the stations by reason of the modulation frequencies being in phase at this point. The translational means may be either moving or at rest, the phase meter indicating changing position if moving, but directly indicating the point of location of the translational means if the reading be taken while the latter is at rest.

If, in addition to the one modulation frequency impressed on the carrier wave, there be also impressed additional synchronized frequencies, as for example 1,500 cycles and 15,000 cycles, greater accuracy in location of position will be obtained. The synchronized frequencies are in geometrical progression, of which the common multiplier is ten, so that on the assumed distance between stations or transmitters, the waves of 1,500 cycle frequency will fall into phase ten times and the waves of 15,000 frequency 100 times.

Where multiple modulation frequencies are employed, the receivers 10 and 11 will be connected to the phase meter 14 through the filters 15, 16 and 17, respectively, for the 150 cycle frequency, the 1,500 cycle frequency, and the 15,000 cycle frequency, but through single-pole triple-throw switches 18 which are interconnected, as at 19, to provide for simultaneous actuation.

In use, the switches 18 will be set to connect the 150 cycle filter in circuit when the phase meter 14 will indicate position, but not so accurately as when the switches are shifted to include the 1,500 cycle filter in circuit, the 1,500 cycle filter failing to give the accuracy of reading on the phase meter that will be possible when the switches are shifted to include the 15,000 cycle filters in circuit.

The 150 cycle filter will indicate in which half of the journey the translational means is located, the additional filters, upon successive use, giving finally the correct position in the area in which the observation is made.

In addition to locating transmitters at the points A and B, additional transmitters may be located at the points C and D and operated on their own independent carrier frequencies. The receivers 10 and 11 may, after an observation taken following their tuning to the transmitters at A and B, be tuned to the transmitters at C and D, thereby determining the position laterally of the line between A and B. Or, the translational means may be equipped with receiving apparatus identical with the receivers 10 and 11 and their attendant parts, so that readings between the stations A and B and the stations C and D may be simultaneously taken, thereby indicating directly on the two phase meters the position in the direction A to B and simultaneously the position with reference to the stations C and D.

Having described the invention, what is claimed as new and useful is:

1. A method for direct indication of position in a given area which comprises projecting from remote points of said area radio waves of any differing fundamental frequencies, impressing on these waves synchronized waves of the same frequencies, so that the synchronized waves will have varying phase relations between said points, and then determining position at any intermediate point by the measured phase relation of the synchronized waves at that point.

2. A method for direct indication of position in a given area which comprises projecting from remote points of said area carrier waves of differing fundamental frequencies, impressing on these waves synchronized modulation waves whose wave length is directly proportional to the distance separating said points, so that there will be a progressively varying phase relation of said modulation waves between said points, and then determining position at any intermediate point by the measured phase relation of the modulation waves at that point.

3. A method for direct indication of position in a given area which comprises projecting from remote points of said area carrier waves of differing fundamental frequencies, impressing on these waves synchronized modulation waves of the same frequencies and whose wave length is directly proportional to the distance separating said points, so that there will be a progressively varying phase relation of said modulation waves between said points, and then determining position at any intermediate point by the measured phase relation of the modulation waves at that point.

4. A method for direct indication of position in a given area which comprises projecting from remote points of said area carrier waves of differing fundamental frequencies, impressing on these waves synchronized modulation waves of the same frequencies and whose wave length is directly proportional to the distance separating said points so that there will be a progressively varying phase relation of said modulation waves between said points, separately receiving the carrier waves at any intermediate point, and then measuring the phase relation of the modulation waves at that point to determine its position with respect to either or both of said remote points.

5. A method for direct indication of position in a given area which comprises projecting from remote points of said area carrier waves of differing fundamental frequencies, impressing on these waves modulation waves whose frequencies are in geometrical progression and directly proportional to the distance between said points, the modulation waves impressed on one carrier wave having the same frequencies as those impressed on the other carrier wave and the modulation waves of like frequencies on the two carrier waves being synchronized, whereby there will be a progressive varying phase relation of the modulation waves, and then determining position at any intermediate point by successively measuring the phase relation of the modulation waves of successive pairs.

JOHN P. SHANKLIN.